(12) United States Patent
Fukuri et al.

(10) Patent No.: US 10,719,024 B2
(45) Date of Patent: Jul. 21, 2020

(54) METHOD FOR PRODUCING BINDER RESIN

(71) Applicant: KAO CORPORATION, Tokyo (JP)

(72) Inventors: Norihiro Fukuri, High Point, NC (US); Takashi Kubo, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 16/114,495

(22) Filed: Aug. 28, 2018

(65) Prior Publication Data

US 2019/0072867 A1 Mar. 7, 2019

Related U.S. Application Data

(60) Provisional application No. 62/553,528, filed on Sep. 1, 2017.

(51) Int. Cl.
*G03G 9/087* (2006.01)
*C08G 63/547* (2006.01)
*C08G 63/672* (2006.01)

(52) U.S. Cl.
CPC ....... *G03G 9/08755* (2013.01); *C08G 63/547* (2013.01); *C08G 63/672* (2013.01); *G03G 9/08795* (2013.01); *G03G 9/08797* (2013.01)

(58) Field of Classification Search
CPC .......... G03G 9/08755; G03G 9/08795; C08G 63/547; C08G 63/672
See application file for complete search history.

(56) References Cited

U.S. PATENT DOCUMENTS

| 5,830,979 A | * | 11/1998 | Nakayama | ........... C08G 63/123 528/272 |
| 2014/0186764 A1 | * | 7/2014 | Yamada | ................... G03G 9/12 430/114 |
| 2015/0301467 A1 | | 10/2015 | Moffat et al. | |

FOREIGN PATENT DOCUMENTS

| JP | 2009-69827 | 4/2009 |
| JP | 2009-192694 | 8/2009 |
| JP | 2016-114829 | 6/2016 |

* cited by examiner

*Primary Examiner* — Peter L Vajda
(74) *Attorney, Agent, or Firm* — Oblon, McClelland, Maier & Neustadt, L.L.P.

(57) ABSTRACT

An embodiment of the present invention relates to a method for producing a binder resin, from which a toner having excellent low-temperature fusing property, roller release properties, and pulverization properties, is obtained, a binder resin, and a toner for development of electrostatic images including the binder resin.

An embodiment of the present invention relates to a method for producing a binder resin including the following steps (1) and (2):

step (1): mixing an aromatic alcohol including an alkylene oxide adduct of bisphenol A and fumaric acid; and step (2): further adding a carboxylic acid to the mixture obtained in the step (1) and mixing until a softening point of the binder resin in the system falls within the predetermined range, wherein in the molecular weight distribution measured by gel permeation chromatography, the binder resin includes 40% or more of components having a molecular weight of 10,000 or more and has a peak top of molecular weight distribution within a range of 7,500 or more and 10,000 or less.

19 Claims, 1 Drawing Sheet

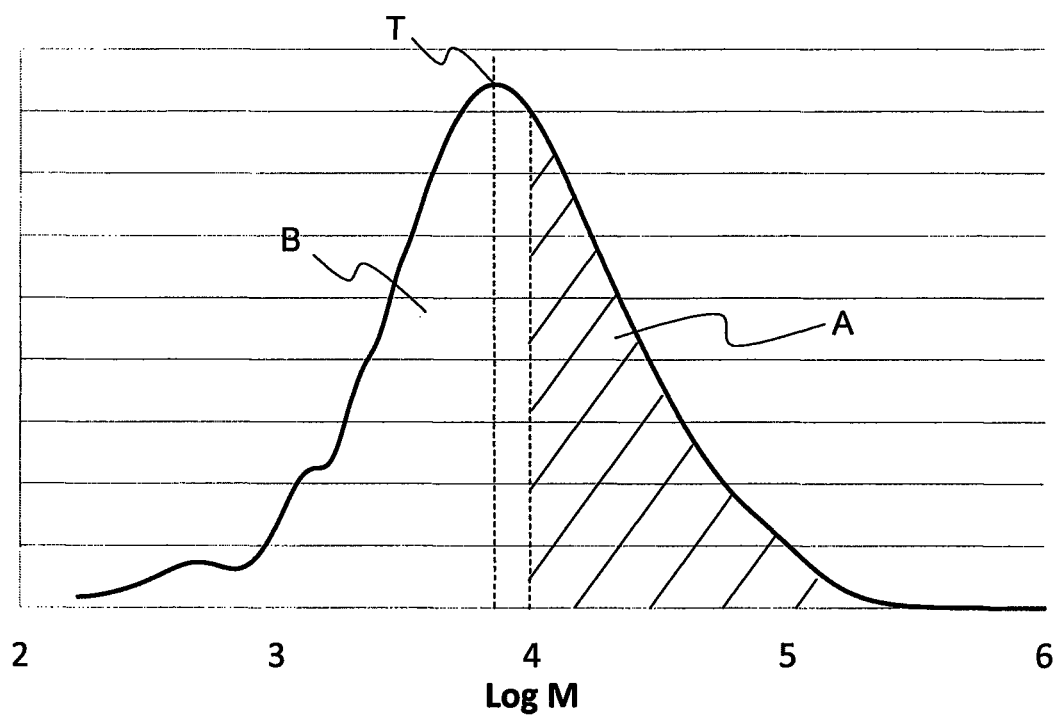

METHOD FOR PRODUCING BINDER RESIN

FIELD OF THE INVENTION

The present invention relates to a method for producing a binder resin to be used for a toner for development of electrostatic images, which is used for development of latent images formed in an electrophotographic method, an electrostatic recording method, an electrostatic printing method, etc., a binder resin, and a toner for development of electrostatic images including the binder resin.

BACKGROUND OF THE INVENTION

In the field of electrophotography, with the progress of electrophotographic systems, it has been demanded to develop toners for development of electrostatic images adaptable for high image quality and high copying or printing speed.

In patent literature 1, a method for producing a toner for electrophotography including a step of melt-kneading toner raw material containing a binder resin having a softening point of 90 to 120° C., a colorant, and a wax having a melting point of 60 to 100° C., wherein the binder resin contains a linear polyester obtained by condensation polymerization of a carboxylic acid component containing 50 mol % or more of fumaric acid and/or maleic acid and an alcohol component; the content of the wax is 4 parts by weight or less on the basis of 100 parts by weight of the binder resin; the melt-kneading process is carried out by using an open-roll type kneading machine having two rolls having a different temperature from each other; and in one roll having a higher temperature in an upstream side of kneading in the open-roll type kneading machine, the set temperature in the upstream side of kneading is not higher than the softening point of the binder resin, and the set temperature in the downstream side of kneading is not lower than the melting point of the wax, with a ratio of the set temperatures in the upstream side and the downstream side {(set temperature (° C.) in the upstream side)/(set temperature (° C.) in the downstream side)} being 1.0 to 1.5 is written. It is written that according to the production method, a good color image having good low-temperature fusing property even under a low pressurizing force on fusing and having excellent color reproducibility is obtained.

In patent literature 2, a process for making a toner resin including: reacting an organic diol with a cyclic alkylene carbonate in the presence of a first catalyst to form a polyalkoxy diol; reacting the polyalkoxy diol with one or more diacid reagents in the presence of a second catalyst in an esterification reaction; monitoring an acid value of a resulting mixture from the esterification reaction; and subsequently polycondensing the resulting mixture with an unsaturated diacid to form an unsaturated polyester resin is written.

In patent literature 3, a developing agent including toner particles including a binder resin including a first polyester resin synthesized from a first aromatic monomer and a first aliphatic monomer blended with a molar ratio in an alcohol component being satisfied with the relationship of {(aromatic monomer)>(aliphatic monomer)≥0} and with a molar ratio in an acid component being satisfied with the relationship of {(aliphatic monomer)>(aromatic monomer)}, a release agent, and a colorant is written. It is written that according to the developing agent, it is possible to improve fusing offset properties, light gloss, and storage properties at a high temperature.

In patent literature 4, an electrophotographic toner containing a crystalline resin, an amorphous resin, and a release agent, wherein the crystalline resin contains a crystalline composite resin C including a polycondensation-based resin component which is obtained by performing polycondensation of an alcohol component containing an aliphatic diol having a carbon number of 9 or more and 14 or less and a carboxylic acid component containing an aliphatic dicarboxylic acid compound having a carbon number of 9 or more and 14 or less, and a styrene-based resin component; the amorphous resin contains an amorphous composite resin A including a polycondensation-based resin component which is obtained by performing polycondensation of an alcohol component and a carboxylic acid component containing an aromatic dicarboxylic compound, and a styrene-based resin component; an average circularity of the toner is 0.940 or more; and the content of particles having a particle diameter of 3 μm or less in the toner is 5.0 number % or less is written. It is written that according to the toner is excellent in low-temperature fusing property and durability and is suppressed in wrapping of paper at the time of fusing.

LIST OF PATENT LITERATURE

Patent Literature 1: JP 2009-192694 A
Patent Literature 2: US 2015/0301467 A
Patent Literature 3: JP 2009-69827 A
Patent Literature 4: JP 2016-114829 A

SUMMARY OF THE INVENTION

An embodiment of the present invention relates to the following [1] to [4].

[1] A method for producing a binder resin, including the following steps (1) and (2):
  step (1): mixing an aromatic alcohol including an alkylene oxide adduct of bisphenol A and fumaric acid; and
  step (2): further adding a carboxylic acid to the mixture obtained in the step (1) and mixing until a softening point of the binder resin in the system falls within the predetermined range, wherein
  in the molecular weight distribution measured by gel permeation chromatography, the binder resin includes 40% or more of components having a molecular weight of 10,000 or more and has a peak top of molecular weight distribution within a range of 7,500 or more and 10,000 or less.

[2] A toner for development of electrostatic images, including the binder resin obtained by the production method as set forth in [1].

[3] A binder resin that is a polycondensate of an alcohol component including an alkylene oxide adduct of bisphenol A and a carboxylic acid component including fumaric acid, wherein in the molecular weight distribution measured by gel permeation chromatography, the binder resin includes 40% or more of components having a molecular weight of 10,000 or more and has a peak top of molecular weight distribution within a range of 7,500 or more and 10,000 or less.

[4] A binder resin, which is obtained by a method including the following steps (1) and (2):
  step (1): mixing of an aromatic alcohol including an alkylene oxide adduct of bisphenol A and fumaric acid in an amount of 60 parts by mol or more and 95 parts by mole or less on the basis of 100 parts by mol of the aromatic alcohol at a temperature $T_1$ of 215° C. or higher and 230° C. or lower for 2 hours or more and 6 hours or less; and step (2): further adding a carboxylic acid to the mixture obtained in the step (1) and mixing until a softening point of the resin in the system falls within a range of 95° C. or higher and 105° C. or lower.

BRIEF DESCRIPTION OF THE DRAWING

FIG. 1 is a schematic view of the molecular weight distribution measured by gel permeation chromatography.

DETAILED DESCRIPTION OF THE INVENTION

In the field of electrophotography, from the viewpoint of promoting much more energy saving, excellent low-temperature fusing property is demanded. In order to enhance the low-temperature fusing property, it may be considered to use a low-molecular weight resin. However, in that case, there were involved problems that a printed matter easily stick to a fusing roller and the fusing roller easily get dirty. Furthermore, from the viewpoint of productivity of toners, it is demanded that pulverization properties are excellent, which toner particles having a predetermined particle diameter are obtained at a low pulverization pressure.

An embodiment of the present invention relates to a method for producing a binder resin, from which a toner having excellent low-temperature fusing property and roller release properties is obtained and which is excellent in pulverization properties at the time of production, a binder resin, and a toner for development of electrostatic images including the binder resin.

The method for producing a binder resin (hereinafter also referred to as "binder resin A") of an embodiment of the present invention includes the following steps (1) and (2):

step (1): mixing an aromatic alcohol including an alkylene oxide adduct of bisphenol A and fumaric acid; and step (2): further adding a carboxylic acid to the mixture obtained in the step (1) and mixing until a softening point of the binder resin in the system falls within the predetermined range.

In the molecular weight distribution measured by gel permeation chromatography, the binder resin A includes 40% or more of components having a molecular weight of 10,000 or more and has a peak top of molecular weight distribution within a range of 7,500 or more and 10,000 or less.

In accordance with the aforementioned embodiment of the present invention, there are provided a method for producing a binder resin which is excellent in low-temperature fusing property of the obtained toner (hereinafter also referred to simply as "low-temperature fusing property") and in roller release properties of the obtained toner (hereinafter also referred to simply as "roller release properties"), a binder resin, and a toner for development of electrostatic images including the binder resin.

Though the reasons for this are not elucidated yet, the following may be considered.

In view of the matter that the aforementioned production method includes the steps (1) and (2), the binder resin A includes 40% or more of components having a molecular weight of 10,000 or more and includes a lot of the resin component having a relatively high molecular weight, and therefore, it may be considered that the binder resin A is excellent in roller release properties. Furthermore, in the molecular weight distribution measured by gel permeation chromatography, the binder resin A has a peak top of molecular weight distribution within a range of 7,500 or more and 10,000 or less, and therefore, it may be considered that the binder resin A is able to enhance the low-temperature fusing property and the pulverization properties.

In the aforementioned production method, in the step (1), the aromatic alcohol including an alkylene oxide adduct of bisphenol A and fumaric acid are mixed, and thereafter, in the step (2), the carboxylic acid is added and mixed, thereby successfully widening the molecular weight distribution. Thus, it has been found that both the roller release properties and the pulverization properties can be made compatible with each other without impairing the low-temperature fusing property.

In the aforementioned production method, it may be considered that in the step (1), fumaric acid is crosslinked due to a radical reaction at a high temperature. Thereafter, in the step (2), the carboxylic acid is added, polycondensation among the crosslinked product, the added carboxylic acid, and the aromatic alcohol proceeds, and a high-molecular weight material derived from the crosslinked product and a polycondensate of a relatively low-molecular weight carboxylic acid and the aromatic alcohol are included in the binder resin A, and therefore, it may be considered that the pulverization properties and the roller release properties were improved while keeping the low-temperature fusing property.

Definitions of various terminologies and so on in the present specification are described below.

Whether the resin is crystalline or non-crystalline is judged in terms of a crystallinity index. The crystallinity index is defined in terms of a ratio of a softening point and a highest temperature of endothermic peak of the resin {(softening point (° C.))/(highest temperature of endothermic peak (° C.))} in the measurement method described in the section of Examples as mentioned later. The crystalline resin is a resin having a crystallinity index of 0.6 or more and less than 1.4, preferably 0.7 or more, and more preferably 0.9 or more, and preferably 1.2 or less. The non-crystalline resin is a resin having a crystallinity index of 1.4 or more, or less than 0.6, preferably 1.5 or more, or 0.5 or less, and more preferably 1.6 or more, or 0.5 or less. The crystallinity index can be suitably adjusted by the kinds and ratios of raw material monomers as well as production conditions, such as reaction temperature, reaction time, and cooling rate. The highest temperature of endothermic peak indicates a temperature of the highest peak among endothermic peaks observed. The crystallinity index can be calculated from values obtained by the measurement method of the softening point and the highest temperature of endothermic peak of the resin described in the section of Examples.

The "binder resin" as referred to in the specification means a resin component which is included in the toner, including the binder resin A.

<Step (1)>

In the step (1), the aromatic alcohol including an alkylene oxide adduct of bisphenol A and fumaric acid are mixed.

Preferably, the step (1) is a step of mixing the aromatic alcohol including an alkylene oxide adduct of bisphenol A and the fumaric acid in an amount of 60 parts by mol or more and 95 parts by mol or less on the basis of 100 parts by mol of the aromatic alcohol at a temperature $T_1$ of 215° C. or higher and lower than 230° C. for 2 hours or more and 6 hours or less.

The aromatic alcohol preferably includes an alkylene oxide adduct of bisphenol, and more preferably includes an alkylene oxide adduct of bisphenol A represented by the formula (I):

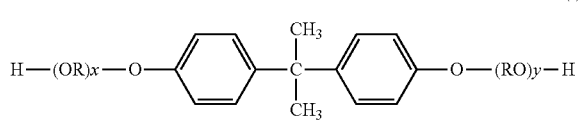
(I)

wherein, OR and RO are each an oxyalkylene group; R is at least one selected from an ethylene group and a propylene group; x and y are each an average addition molar number of the alkylene oxide and a positive number; and a value of the sum of x and y is 1 or more, and preferably 1.5 or more, and it is 16 or less, preferably 8 or less, and more preferably 4 or less.

The bisphenol A is 2,2-bis(4-hydroxyphenyl)propane.

Examples of the alkylene oxide adduct of bisphenol A represented by the formula (I) include a propylene oxide adduct of bisphenol A and an ethylene oxide adduct of bisphenol A. These are preferably used either alone or in combination of two or more thereof. Among these, a propylene oxide adduct of bisphenol A is preferred from the viewpoint of more improving low-temperature fusing property and pulverization properties.

The content of the alkylene oxide adduct of bisphenol A in the alcohol component is preferably 40 mol % or more, more preferably 60 mol % or more, still more preferably 70 mol % or more, yet still more preferably 90 mol % or more, and even yet still more preferably 95 mol % or more, and it is 100 mol % or less, and even still more preferably 100 mol %.

In the step (1), other alcohol component may be included.

Examples of the other alcohol component include aliphatic polyols.

Examples of the aliphatic polyol include aliphatic diols having a carbon number of 2 or more and 20 or less; and trihydric or higher hydric aliphatic alcohols, such as glycerin.

Examples of the aliphatic diol include ethylene glycol, 1,2-propanediol, 1,3-propanediol, 1,4-butanediol, 1,5-pentanediol, 1,6-hexanediol, 1,4-butenediol, 1,3-butanediol, neopentyl glycol, 1,10-decanediol, and 1,12-dodecanediol.

In the step (1), the amount of fumaric acid is preferably 60 parts by mol or more, more preferably 65 parts by mol or more, still more preferably 70 parts by mol or more, yet still more preferably 75 parts by mol or more, and even yet still more preferably 80 parts by mol or more, and it is preferably 95 parts by mol or less, more preferably 90 parts by mol or less, and still more preferably 85 parts by mol or less, on the basis of 100 parts by mol of the aromatic alcohol, from the viewpoint of more improving low-temperature fusing property and roller release properties.

In the step (1), the mixing temperature $T_1$ is preferably 215° C. or higher, more preferably 218° C. or higher, and still more preferably 220° C. or higher, from the viewpoint of more improving roller release properties and pulverization properties, and is preferably lower than 230° C., and more preferably 225° C. or lower, from the viewpoint of more improving low-temperature fusing property and pulverization properties.

By mixing the aromatic alcohol and the fumaric acid at such temperature $T_1$, it may be considered that the cross-linking due to heat polymerization of the fumaric acid is promoted, whereby the roller release properties and the pulverization properties are more improved.

A holding time at the temperature $T_1$ is preferably 2 hours or more, and more preferably 2.5 hours or more, from the viewpoint of more improving roller release properties and pulverization properties, and is preferably 6 hours or less, more preferably 5 hours or less, and still more preferably 4 hours or less, from the viewpoint of more improving low-temperature fusing property and pulverization properties.

The holding time at the temperature $T_1$ means a time for which the temperature falls within the prescribed range of the temperature $T_1$.

Preferably, the step (1) is performed by mixing in the presence of an esterification catalyst. In the step (1), a promotor may further be used.

Examples of the esterification catalyst include tin compounds, such as monobutyltin oxide, dibutyltin oxide, and tin(II) 2-ethylhexanoate; and titanium compounds, such as titanium diisopropylate bistriethanol aminate. Among these, monobutyltin oxide is preferred.

The amount of the esterification catalyst is preferably 0.01 parts by mass or more, and more preferably 0.1 parts by mass or more, and it is preferably 1 part by mass or less, and more preferably 0.6 parts by mass or less, on the basis of 100 parts by mass of the total amount of the aromatic alcohol in the step (1), the fumaric acid in the step (1), and the carboxylic acid in the step (2).

Examples of the esterification promotor which may be used together with the esterification catalyst include pyrogallol, gallic acid, gallic acid esters, benzophenone derivatives, such as 2,3,4-trihydroxybenzophenone and 2,2',3,4-tetrahydroxybenzophenone, and catechin derivatives, such as epigallocatechin and epigallocatechin gallate.

The amount of the esterification promotor is preferably 0.001 parts by mass or more, and more preferably 0.01 parts by mass or more, and it is preferably 0.5 parts by mass or less, and more preferably 0.1 parts by mass or less, on the basis of 100 parts by mass of the total amount of the aromatic alcohol in the step (1), the fumaric acid in the step (1), and the carboxylic acid in the step (2).

In the step (1), a polymerization inhibitor is preferably used.

Examples of the polymerization inhibitor include hydroquinone-based compounds, such as hydroquinone and methylhydroquinone, and catechol-based compounds, such as catechol and 2-t-butylcatechol.

The amount of the polymerization inhibitor is preferably 0.001 parts by mass or more, and more preferably 0.01 parts by mass or more, and it is preferably 0.5 parts by mass or less, and more preferably 0.1 parts by mass or less, on the basis of 100 parts by mass of the total amount of the aromatic alcohol in the step (1), the fumaric acid in the step (1), and the carboxylic acid in the step (2).

The step (1) may be performed in an inert gas atmosphere.

<Step (2)>

In the step (2), a carboxylic acid is further added to the mixture obtained in the step (1) and mixed.

The step (2) is a step of further adding the carboxylic acid to the mixture obtained in the step (1) preferably at a temperature $T_2$ that is lower than the mixing temperature $T_1$ in the step (1), and more preferably at a temperature $T_2$ of 180° C. or higher and lower than 225° C. and mixing at the aforementioned temperature $T_2$ until a softening point of the resin in the system falls within a range of 95° C. or higher and 105° C. or lower.

Examples of the carboxylic acid which is added in the step (2) include dicarboxylic acids and trivalent or higher valent carboxylic acids.

Examples of the dicarboxylic acid include aromatic dicarboxylic acids, straight-chain or branched aliphatic dicarboxylic acids, and alicyclic dicarboxylic acids. Among these, at least one selected from aromatic dicarboxylic acids and straight-chain or branched aliphatic dicarboxylic acids is preferred.

Examples of the aromatic dicarboxylic acid include phthalic acid, isophthalic acid, and terephthalic acid.

The carbon number of the straight-chain or branched aliphatic dicarboxylic acid is preferably 2 or more, and more preferably 3 or more, and it is preferably 30 or less, and more preferably 20 or less.

Examples of the straight-chain or branched aliphatic dicarboxylic acid include oxalic acid, malonic acid, maleic acid, fumaric acid, citraconic acid, itaconic acid, glutaconic acid, succinic acid, adipic acid, sebacic acid, dodecanedioic acid, azelaic acid, and a succinic acid substituted with an alkyl group having a carbon number of 1 or more and 20 or less or an alkenyl group having a carbon number of 2 or more and 20 or less. Examples of the succinic acid substituted with an alkyl group having a carbon number of 1 or more and 20 or less or an alkenyl group having a carbon number of 2 or more and 20 or less include dodecylsuccinic acid, dodecenylsuccinic acid, and octenylsuccinic acid. Among these, fumaric acid is preferred from the viewpoint of more improving low-temperature fusing property, roller release properties, and pulverization properties.

The trivalent or higher valent carboxylic acid is preferably a trivalent carboxylic acid, and examples thereof include trimellitic acid or an anhydride thereof.

These carboxylic acid components can be used either alone or in combination of two or more thereof.

Among these, straight-chain or branched aliphatic dicarboxylic acids and trivalent or higher valent carboxylic acids are preferred, fumaric acid and trimellitic acid or an anhydride thereof are more preferred, and fumaric acid is still more preferred.

The amount of the carboxylic acid in the step (2) is preferably 3 parts by mol or more, more preferably 6 parts by mol or more, still more preferably 10 parts by mole or more, and yet still more preferably 15 parts by mol or more, and is preferably 35 parts by mol or less, more preferably 30 parts by mol or less, and still more preferably 25 parts by mol or less, on the basis of 100 parts by mol of the aromatic alcohol, from the viewpoint of more improving low-temperature fusing property and pulverization properties.

A molar ratio (A1/A2) of the amount A1 of the fumaric acid in the step (1) and the amount A2 of the carboxylic acid in the step (2) is preferably 70/30 or more, more preferably 75/25 or more, and still more preferably 80/20 or more, and is preferably 99/1 or less, more preferably 95/5 or less, still more preferably 90/10 or less, and yet still more preferably 85/15 or less, from the viewpoint of more improving low-temperature fusing property, roller release properties, and pulverization properties.

A molar ratio of a total molar amount of the amount A1 of the fumaric acid in the step (1) and the amount A2 of the carboxylic acid in the step (2) and a molar amount G of the aromatic alcohol ((A1+A2)/G) is preferably 0.94 or more, more preferably 0.96 or more, still more preferably 0.98 or more, and yet still more preferably 1.00 or more, and is preferably 1.07 or less, more preferably 1.05 or less, and still more preferably 1.03 or less, from the viewpoint of more improving low-temperature fusing property, roller release properties, and pulverization properties.

In the step (2), the temperature $T_2$ is preferably 180° C. or higher, more preferably 185° C. or higher, and still more preferably 188° C. or higher, and is preferably lower than 225° C., more preferably lower than 215° C., still more preferably 210° C. or lower, yet still more preferably 200° C. or lower, and even yet still more preferably 195° C. or lower, from the viewpoint of more improving low-temperature fusing property, roller release properties, and pulverization properties.

A difference [$T_1-T_2$] between the temperature $T_1$ in the step (1) and the temperature $T_2$ in the step (2) is preferably −5° C. or more, more preferably 0° C. or more, still more preferably 5° C. or more, yet still more preferably 10° C. or more, even yet preferably 20° C. or more, and even still more preferably 25° C. or more, and is preferably 45° C. or less, more preferably 40° C. or less, and still more preferably 35° C. or less, from the viewpoint of more improving low-temperature fusing property, roller release properties, and pulverization properties.

A holding time at the temperature $T_2$ is preferably 1 hour or more, and more preferably 1.5 hours or more, from the viewpoint of more improving pulverization properties, and is preferably 6 hours or less, more preferably 4 hours or less, and still more preferably 3 hours or less, from the viewpoint of more improving low-temperature fusing property.

The holding time at the temperature $T_2$ means a time for which after addition of the carboxylic acid in the step (2), the temperature falls within the range of the temperature $T_2$ as prescribed above.

The mixing at the temperature $T_2$ is preferably performed until a softening point of the resin in the system falls within a range of 95° C. or higher and 105° C. or lower, from the viewpoint of more improving low-temperature fusing property, roller release properties, and pulverization properties.

The softening point of the resin in the system at the time of completion of mixing in the step (2) is preferably 96° C. or higher, more preferably 97° C. or higher, and still more preferably 98° C. or higher, from the viewpoint of more improving roller release properties, and is preferably 105° C. or lower, more preferably 104° C. or lower, still more preferably 103° C. or lower, and yet still more preferably 102° C. or lower, from the viewpoint of more improving low-temperature fusing property and pulverization properties.

Similar to the step (1), preferably, the step (2) is performed by mixing in the presence of an esterification catalyst. In the step (2), the mixing may be performed in the presence of a promotor. In addition, in the step (2), the mixing may also be performed in the presence of a polymerization inhibitor.

The esterification catalyst, the promotor, and the polymerization inhibitor are the same as those in the step (1).

The step (2) may be performed in an inert gas atmosphere.

In the step (2), the mixing is preferably performed under a reduced pressure condition. The pressure in the step (2) is preferably 2 kPa or more, and more preferably 3 kPa or more, and it is preferably 20 kPa or less, more preferably 15 kPa or less, and still more preferably 12 kPa or less.

[Binder Resin A]

In the molecular weight distribution measured by gel permeation chromatography (hereinafter also referred to simply as "GPC"), the binder resin A which is obtained in the aforementioned production method includes 40% or more of components having a molecular weight of 10,000 or more and has a peak top of molecular weight distribution within a range of 7,500 or more and 10,000 or less.

The binder resin A is, for example, a polycondensate of an alcohol component including an alkylene oxide adduct of bisphenol A and a carboxylic acid component including fumaric acid.

The binder resin A is preferably non-crystalline.

FIG. 1 is a schematic view of the molecular weight distribution measured by gel permeation chromatography.

The proportion of the components having a molecular weight of 10,000 or more is, for example, expressed by a proportion of an area A expressed by oblique lines relative to a total area B of all of molecular weights in FIG. 1. Namely, the proportion of the components having a molecular weight of 10,000 or more is calculated according to a numerical expression represented by the following formula (1).

Proportion of components having a molecular weight of 10,000 or more (%)={(Total area $A$ of molecular weight of 10,000 or more)/(Total area $B$ of all of molecule weights)}×100  (1)

In the binder resin A, the proportion of the components having a molecular weight of 10,000 or more is preferably 40% or more, more preferably 42% or more, still more preferably 43% or more, and yet still more preferably 44% or more, and is preferably 60% or less, more preferably 50% or less, and still more preferably 45% or less, from the viewpoint of obtaining excellent low-temperature fusing property, roller release properties, and pulverization properties.

For example, the peak top of the molecular weight distribution represents a peak top T in FIG. 1.

In the binder resin A, the peak top of the molecular weight distribution is preferably 7,500 or more, and more preferably 8,000 or more, and it is preferably 10,000 or less, more preferably 9,000 or less, and still more preferably 8,500 or less, from the viewpoint of obtaining excellent low-temperature fusing property, roller release properties, and pulverization properties.

Regarding to the molecular weight distribution measured by measured by gel permeation chromatography, detailed measurement method follow the methods described in the section of Examples.

A softening point of the binder resin A is preferably 95° C. or higher, more preferably 98° C. or higher, and still more preferably 100° C. or higher, from the viewpoint of more improving roller release properties, and is preferably 105° C. or lower, more preferably 104° C. or lower, still more preferably 103° C. or lower, and yet still more preferably 102° C. or lower, from the viewpoint of more improving low-temperature fusing property and pulverization properties.

A glass transition temperature of the binder resin A is preferably 45° C. or higher, more preferably 50° C. or higher, and still more preferably 55° C. or higher, from the viewpoint of more improving roller release properties, and is preferably 80° C. or lower, more preferably 75° C. or lower, still more preferably 70° C. or lower, yet still more preferably 65° C. or lower, and even yet still more preferably 60° C. or lower, from the viewpoint of more improving low-temperature fusing property and pulverization properties.

An acid value of the binder resin A is preferably 40 mgKOH/g or less, more preferably 30 mgKOH/g or less, and still more preferably 25 mgKOH/g or less, from the viewpoint of more improving roller release properties, and is preferably 1 mgKOH/g or more, more preferably 5 mgKOH/g or more, and still more preferably 10 mgKOH/g or more, from the viewpoint of more improving low-temperature fusing property and pulverization properties.

A weight average molecular weight Mw of the binder resin A is preferably 5,000 or more, more preferably 10,000 or more, still more preferably 15,000 or more, and yet still more preferably 16,000 or more, from the viewpoint of more improving roller release properties, and is preferably 100,000 or less, more preferably 70,000 or less, still more preferably 50,000 or less, yet still more preferably 20,000 or less, even yet still more preferably 18,000 or less, and even still more preferably 17,000 or less, from the viewpoint of more improving low-temperature fusing property and pulverization properties.

A number average molecular weight Mn of the binder resin A is preferably 1,000 or more, more preferably 2,000 or more, still more preferably 3,000 or more, yet still more preferably 3,500 or more, and even yet still more preferably 3,600 or more, from the viewpoint of more improving roller release properties, and is preferably 7,000 or less, more preferably 5,000 or less, still more preferably 4,500 or less, yet still more preferably 4,000 or less, and even yet still more preferably 3,800 or less, from the viewpoint of more improving low-temperature fusing property and pulverization properties.

A polydispersity (Mw/Mn) of the binder resin A is preferably 1.5 or more, more preferably 2.5 or more, still more preferably 3.5 or more, and yet still more preferably 4.0 or more, and is preferably 20 or less, more preferably 15 or less, still more preferably 8 or less, yet still more preferably 6 or less, even yet still more preferably 5 or less, and even still more preferably 4.8 or less, from the viewpoint of more improving low-temperature fusing property, roller release properties, and pulverization properties.

Measurement methods of the softening point, glass transition temperature, acid value, weight average molecular weight, number average molecular weight, and polydispersity follow the methods described in the section of Examples.

[Toner for Development of Electrostatic Images]

The obtained binder resin A is used for a toner for development of electrostatic images (hereinafter also referred to simply as "toner"). The toner according to the embodiment of the present invention includes the binder resin A.

More specifically, the toner according to an embodiment of the present invention may, for example, contain toner particles including the binder resin A and an external additive.

The content of the binder resin A in the binder resin of the toner is preferably 20% by mass or more, more preferably 40% by mass or more, still more preferably 60% by mass or more, yet still more preferably 80% by mass or more, even yet still more preferably 90% by mass or more, and even still more preferably 95% by mass or more, and it is preferably 100% by mass or less.

[Binder Resin H]

The toner may further include, in addition to the aforementioned binder resin A, a binder resin H having a softening point higher by at least 20° C.

The softening point of the binder resin H is preferably 150° C. or lower, more preferably 140° C. or lower, and still more preferably 135° C. or lower, and is preferably 110° C. or higher, more preferably 120° C. or higher, and still more preferably 130° C. or higher, from the viewpoint of more improving low-temperature fusing property.

A difference in the softening point between the binder resin H and the binder resin A is preferably 10° C. or higher, more preferably 20° C. or higher, still more preferably 25° C. or higher, and yet still more preferably 30° C. or higher, and is preferably 60° C. or lower, more preferably 50° C. or lower, and still more preferably 40° C. or lower.

In the case of including the binder resin H, a mass ratio of the binder resin A and the binder resin H {(binder resin A)/(binder resin H)} is preferably 10/90 or more, more preferably 20/80 or more, and still more preferably 25/75 or more, and is preferably 80/20 or less, more preferably 60/40 or less, and still more preferably 50/50 or less.

A total content of the binder resin A and the binder resin H in the binder resin of the toner is preferably 80% by mass or more, more preferably 90% by mass or more, and still more preferably 95% by mass or more, and it is preferably 100% by mass or less.

The toner may include additives, such as a charge control agent, a colorant, a release agent, a magnetic powder, a fluidity improver, a conductive modifier, a reinforcing agent, such as a fibrous material, an antioxidant, an age resistor, and a cleanability improver. Among these, a charge control agent, a colorant, and a release agent are preferred. Preferably, such an additive is included in the toner particles.

<Charge Control Agent>

As the charge control agent, for example, all of a positively chargeable charge control agent and a negatively chargeable charge control agent may be contained.

Examples of the positively chargeable charge control agent include nigrosine dyes, for example, "NIGROSINE BASE EX", "OIL BLACK BS", "OIL BLACK SO", "BONTRON N-01", "BONTRON N-04", "BONTRON N-07", "BONTRON N-09", and "BONTRON N-11" (all of which are manufactured by Orient Chemical Industries Co., Ltd.), etc.; triphenylmethane-based dyes containing a tertiary amine in a side chain thereof, and quaternary ammonium salt compounds, for example, "BONTRON P-51" (manufactured by Orient Chemical Industries Co., Ltd.), cetyltrimethylammonium bromide, "COPY CHARGE PX VP435" (manufactured by Clariant), etc.; polyamine resins, for example, "AFP-B" (manufactured by Orient Chemical Industries Co., Ltd.), etc.; imidazole derivatives, for example, "PLZ-2001" and "PLZ-8001" (all of which are manufactured by Shikoku Chemicals Corporation), etc.; and styrene-acrylic resins, for example, "FCA-701PT" (manufactured by Fujikura Chemical Co., Ltd.).

Examples of the negatively chargeable charge control agent include metal-containing azo dyes, for example, "VALIFAST BLACK 3804", "BONTRON S-31", "BONTRON S-32", "BONTRON S-34", and "BONTRON S-36" (manufactured by Orient Chemical Industries Co., Ltd.), "AIZEN SPILON BLACK TRH" and "T-77" (manufactured by Hodogaya Chemical Co., Ltd.), etc.; metal compounds of benzilic acid compounds, for example, "LR-147" and "LR-297" (all of which are manufactured by Japan Carlit Co., Ltd.), etc.; metal compounds of salicylic acid compounds, for example, "BONTRON E-81", "BONTRON E-84", "BONTRON E-88", and "BONTRON E-304" (all of which are manufactured by Orient Chemical Industries Co., Ltd.), "TN-105" (manufactured by Hodogaya Chemical Co., Ltd.), etc.; copper phthalocyanine dyes; quaternary ammonium salts, for example, "COPY CHARGE NX VP434" (manufactured by Clariant), nitroimidazole derivatives, etc.; and organic metal compounds.

Among the charge control agents, negatively chargeable charge control agents are preferred, and metal compounds of benzilic acid compounds or metal compounds of salicylic acid compounds are more preferred.

The content of the charge control agent is preferably 0.01 parts by mass or more, and more preferably 0.2 parts by mass or more, and it is preferably 10 parts by mass or less, more preferably 5 parts by mass or less, still more preferably 3 parts by mass or less, and yet still more preferably 2 parts by mass or less, on the basis of 100 parts by mass of the binder resin in the toner.

<Colorant>

As the colorant, all of dyes, pigments, and so on, which are used as a colorant for toners, may be used. For example, carbon black, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, Carmine 6B, Disazo Yellow, and so on may be used. The toner may be any of black toners and color toners.

The content of the colorant is preferably 1 part by mass or more, and more preferably 2 parts by mass or more, and it is preferably 40 parts by mass or less, more preferably 20 parts by mass or less, and still more preferably 10 parts by mass or less, on the basis of 100 parts by mass of the binder resin in the toner.

<Release Agent>

Examples of the release agent include hydrocarbon-based waxes, such as a polypropylene wax, a polyethylene wax, a polypropylene polyethylene copolymer wax, a microcrystalline wax, a paraffin wax, a Fischer-Tropsch wax, and a Sazole wax, and oxides thereof; ester-based waxes, such as a carnauba wax, a montan wax, and deacidified waxes thereof; and a fatty acid ester wax; aliphatic acid amides, fatty acids, higher alcohols, and fatty acid metal salts. These may be used either alone or in combination of two or more thereof.

A melting point of the release agent is preferably 60° C. or higher, and more preferably 70° C. or higher, and from the viewpoint of low-temperature fusing property, the melting point of the release agent is preferably 160° C. or lower, and more preferably 145° C. or lower.

The content of the release agent is preferably 0.5 parts by mass or more, more preferably 1 part by mass or more, and still more preferably 1.5 parts by mass or more, and from the viewpoint of dispersibility in the binder resin, the content of the release agent is preferably 10 parts by mass or less, more preferably 8 parts by mass or less, and still more preferably 7 parts by mass or less, on the basis of 100 parts by mass of the binder resin in the toner.

A volume median particle diameter ($D_{50}$) of the toner particles is preferably 2 μm or more, more preferably 3 μm or more, and still more preferably 4 μm or more, and it is preferably 20 μm or less, more preferably 15 μm or less, and still more preferably 10 μm or less.

Though the toner particles may be used directly as a toner, those obtained by subjecting the toner particle surfaces to an addition treatment with a fluidizing agent, etc. as the external additive are preferably used.

Examples of the external additive include inorganic material fine particles of hydrophobic silica, titanium oxide, alumina, cerium oxide, carbon black, etc.; and polymer fine particles of a polycarbonate, polymethyl methacrylate, a silicone resin, etc. Among these, hydrophobic silica is preferred.

In the case of containing the external additive, the addition amount of the external additive is preferably 1 part by mass or more, more preferably 2 parts by mass or more, and still more preferably 3 parts by mass or more, and it is preferably 5 parts by mass or less, more preferably 4.5 parts by mass or less, and still more preferably 4 parts by mass or less, on the basis of 100 parts by mass of the toner particles.

The toner is used for development of latent images to be formed in an electrophotographic method, an electrostatic recording method, an electrostatic printing method, etc. The toner may be used as one-component developer, or may be mixed with a carrier and used as a two-component developer.

[Production Method of Toner]

Though the toner may be a toner obtained by any of known methods, such as a melt-kneading method, an emulsion phase inversion method, a polymerization method, and an emulsion coagulation method, from the viewpoints of productivity and dispersibility of the colorant, a pulverized toner by the melt-kneading method is preferred.

In the case of a pulverized toner, for example, a method for producing a toner includes:

step (a): melt-kneading toner raw materials including the binder resin A; and step (b): pulverizing and classifying the melt-kneaded mixture obtained in the step (a) to obtain toner particles.

In the step (a), the toner raw materials may include other additives, such as the binder resin H, the release agent, the charge control agent, and the colorant. Preferably, these toner raw materials are previously mixed with a mixer, such as a Henschel mixer and a ball mill, and then fed into a kneader.

A temperature of the melt-kneading is preferably 80° C. or higher, more preferably 100° C. or higher, and still more preferably 110° C. or higher, and it is preferably 160° C. or lower, and more preferably 150° C. or lower.

The melt-kneading in the step (a) can be performed with a known kneader, such as a closed kneader, a single-screw extruder, a twin-screw extruder, and an open-roll type kneader. From the viewpoint of melt-mixing crystals, a twin-screw extruder which can be set under a high-temperature condition is preferred.

The molten mixture obtained in the step (a) is cooled to an extent such that it is possible to perform the pulverization, and then subjected to the subsequent step (b).

The pulverization of the step (b) may be performed in divided multi-stages. For example, the resin kneaded material obtained by curing the molten mixture may be coarsely pulverized to a size of 1 mm or more and 5 mm or less and then further finely pulverized to a desired particle diameter.

Examples of a pulverizer which is suitably used for coarse pulverization include a hammer mill, an atomizer, and Rotoplex. Examples of a pulverizer which is suitably used for fine pulverization include a fluidized bed jet mill, a collision plate-type jet mill, and a rotary mechanical mill. From the viewpoint of pulverization efficiency, it is preferred to use a fluidized bed jet mill or a collision plate-type jet mill, and it is more preferred to use a collision plate-type jet mill.

Examples of a classifier which is used for classification include a rotor type classifier, an air classifier, an inertial classifier, and a sieve classifier. The pulverized product which is insufficiently pulverized and removed during the classifying step may be subjected to the pulverization step again, and the pulverization step and the classification step may be repeated, as required.

As for the obtained toner particles, the toner particle surfaces may be subjected to an addition treatment with a fluidizing agent, etc. as the external additive.

EXAMPLES

The present invention is hereunder specifically described by reference to Examples, but it should be construed that the present invention is by no means limited by these Examples. Properties of resins and so on were measured by the following methods.

[Measurement Methods]
[Acid Value of Resin]

The acid value of the resin is measured on the basis of the method of JIS K0070:1992. However, only the measurement solvent is changed from a mixed solvent of ethanol and ether as prescribed in JIS K0070:1992 to a mixed solvent of acetone and toluene (acetone/toluene=1/1 (volume ratio)).

[Softening Point and Glass Transition Temperature of Resin]
(1) Softening Point

Using a flow tester "CFT-500D" (manufactured by Shimadzu Corporation), 1 g of a sample is extruded through a nozzle having a diameter of 1 mm and a length of 1 mm by applying a load of 1.96 MPa from a plunger while heating the sample at a temperature rise rate of 6° C./min. A downward movement of the plunger of the flow tester is plotted relative to the temperature, and the temperature at which a half amount of the sample flows out is defined as the softening point.

(2) Highest Temperature of Endothermic Peak

Using a differential scanning calorimeter "DSC 2 STAR" (manufactured by Mettler-Toledo), a sample which has been cooled from room temperature (20° C.) to 0° C. at a temperature drop rate of 10° C./min is kept as it is for one minute. Thereafter, the measurement is performed while raising the temperature to 180° C. at a temperature rise rate of 10° C./min. Among the endothermic peaks observed, a temperature of the peak of the highest temperature side is defined as the highest temperature of endothermic peak.

(3) Glass Transition Temperature

Using a differential scanning calorimeter "DSC 2 STAR" (manufactured by Mettler-Toledo), 0.01 to 0.02 g of a sample is weighed in an aluminum pan, subjected to temperature rise to 200° C., and then cooled from that temperature to 0° C. at a temperature drop rate of 10° C./min. Subsequently, the measurement is performed while raising the temperature to 150° C. at a temperature rise rate of 10° C./min. A temperature of an intersection of the extension of the baseline of not higher than the highest temperature of endothermic peak and the tangential line showing the maximum inclination between the kick-off of the peak and the top of the peak is defined as the glass transition temperature.

[Molecular Weight Distribution Measured by Gel Permeation Chromatography: Number Average Molecular Weight, Weight Average Molecular Weight, Polydispersity, Proportion of Components Having a Molecular Weight of 10,000 or More, and Peak Top of Molecular Weight Distribution of Resin]

The molecular weight distribution is measured by the gel permeation chromatography (GPC) according to the following method. From the results, the number average molecular weight Mn, the weight average molecular weight Mw, the polydispersity Mw/Mn, the proportion of components having a molecular weight of 10,000 or more, and the peak top of molecular weight distribution of a resin are determined.

(4-1) Preparation of Sample Solution

A resin is dissolved in tetrahydrofuran such that its concentration is 0.5 g/100 mL. Subsequently, this solution is filtered with a fluorine resin filter "Syringe Filter" (manufactured by American Chromatography Supplies LLC) having a pore size of 0.45 μm, to remove insoluble components, thereby providing the sample solution.

(4-2) Measurement of Molecular Weight

Using the following apparatus, tetrahydrofuran as an eluent is allowed to flow through a column at a flow rate of 1 mL per minute, and the column is stabilized in a thermostat at 40° C. 100 μL of the sample solution is injected thereinto, and the measurement is performed. The molecular weight of the sample is calculated on the basis of a previously prepared calibration curve. As the calibration curve at this time, a calibration curve prepared from several kinds of monodisperse polystyrenes having an already-known molecular weight (those manufactured by Tosoh Corporation, molecular weight: $2.63\times10^3$, $2.06\times10^4$, $1.02\times10^5$; and those manufactured by GL Sciences Inc., molecular weight: $2.10\times10^3$, $7.00\times10^3$, and $5.04\times10^4$) as standard samples is used.

Measurement apparatus: "HLC-8320 GPC EcoSEC" (manufactured by Tosoh Corporation)

Analyzing column: "TSKgel Guard Super HZ-L"+"TSKgel Super HZM-H"+"TSKgel Super HZ3000" (all of which are manufactured by TOSOH Biosciences LLC)

(4-3) Proportion of Components Having a Molecular Weight of 10,000 or More

An area B obtained from an integrated value of the whole of obtained molecular weight distribution and an area A obtained from an integrated value in the components having a molecular weight of 10,000 or more in the molecular weight distribution are calculated, and the proportion of components having a molecular weight of 10,000 or more is determined according to the following formula (1).

Proportion of components having a molecular weight of 10,000 or more (%)={(Total area $A$ of molecular weight of 10,000 or more)/(Total area $B$ of all of molecule weights)}×100   (1)

(4-4) Peak Top of Molecular Weight Distribution

A molecular weight exhibiting the highest value in the obtained molecular weight distribution is defined as the peak top of molecular weight distribution.

[Volume Median Particle Diameter ($D_{50}$) of Toner Particles and Toner]

The volume median particle diameter ($D_{50}$) of each of the toner particles and the toner was measured by the following method.

Measuring machine: "Coulter Multisizer II" (manufactured by Beckman Coulter, Inc.)

Aperture diameter: 50 μm

Analyzing software: "Coulter Multisizer AccuComp Ver. 1.19" (manufactured by Beckman Coulter, Inc.)

Electrolytic solution: "Isotone II" (manufactured by Beckman Coulter, Inc.)

Dispersion: 5% by mass electrolytic solution of "Emulgen 109P" (manufactured by Kao Corporation, polyoxyethylene lauryl ether, HLB: 13.6)

Dispersing condition: 10 mg of the sample to be measured is added to 5 mL of the dispersion and dispersed with an ultrasonic disperser for one minute. Thereafter, 25 mL of the electrolytic solution is added, and the obtained mixture is further dispersed with an ultrasonic disperser for one minute.

Measurement condition: In a beaker, 100 mL of the electrolytic solution and the dispersion are added, the particle diameters of 30,000 particles are measured in a concentration at which the particle diameters of the 30,000 particles can be measured for 20 seconds, and the volume median particle diameter ($D_{50}$) is determined from a particle size distribution thereof.

Examples A1 to A7, A52, A53, and A55 [Resins A-1 to A-7, A-52, A-53, and A-55]

An alcohol component (G), an acid component (A1), an esterification catalyst, and a polymerization inhibitor shown in Table 1 were placed in a four-necked flask having 10 L-capacity equipped with a dehydration tube equipped with a nitrogen inlet tube, a stirrer, and a thermocouple. After holding the temperature at 180° C. for 1 hour in a nitrogen atmosphere at atmospheric pressure, the temperature was raised to a temperature $T_1$ shown in the table for 2 hours, and thereafter, the temperature $T_1$ was held for a $T_1$-holding time shown in the table were kept. Thereafter, the temperature was set to a temperature $T_2$, and then an acid component (A2) was added and the temperature $T_2$ was held for $T_2$-holding time shown in the table. Thereafter, the reaction was performed at 10 kPa until reaching a softening point shown in the table, thereby obtaining non-crystalline polyester resins A-1 to A-7, A-52, A-53, and A-55. Various properties were measured and shown in Table 1.

Production Examples A51 and A54 [Resins A-51 and A-54]

An alcohol component (G), an acid component (A1), an esterification catalyst, and a polymerization inhibitor shown in Table 1 were placed in a four-necked flask having 10 L-capacity equipped with a dehydration tube equipped with a nitrogen inlet tube, a stirrer, and a thermocouple. After holding the temperature at 180° C. for 1 hour in a nitrogen atmosphere at atmospheric pressure, the temperature was raised to a temperature $T_1$ shown in the table for 2 hours, and thereafter, the temperature $T_1$ was held for a $T_1$-holding time shown in the table. Thereafter, the reaction was performed at 10 kPa until reaching a softening point shown in the table, thereby obtaining non-crystalline polyester resins A-51 and A-54. Various properties were measured and shown in Table 1.

TABLE 1

| | | | Production Example | | | | | | | |
|---|---|---|---|---|---|---|---|---|---|---|
| | | | A1 | | A2 | | A3 | | A4 | |
| | | | Binder resin | | | | | | | |
| | | | A-1 | | A-2 | | A-3 | | A-4 | |
| | | | Charge amount (g) | Parts by mol *3 | Charge amount (g) | Parts by mol *3 | Charge amount (g) | Parts by mol *3 | Charge amount (g) | Parts by mol *3 |
| Raw material monomer | Alcohol component (G) | BPA-PO *1 | 7000 | 100 | 7000 | 100 | 7000 | 100 | 7000 | 100 |
| | | BPA-EO *2 | — | — | — | — | — | — | — | — |
| | 1st step Acid component (A1) | Fumaric acid | 1926 | 83 | 2088 | 90 | 1624 | 70 | 1926 | 83 |
| | | Terephthalic acid | — | — | — | — | — | — | — | — |
| | 2nd step Acid component (A2) | Fumaric acid | 441 | 19 | 278 | 12 | 742 | 32 | 302 | 13 |
| | | Trimellitic anhydride | — | — | — | — | — | — | — | — |
| | (A1 + A2)/G | | | 1.02 | | 1.02 | | 1.02 | | 0.96 |

TABLE 1-continued

| Process | 1st step | Temperature $T_1$ (° C.) | 220 | 220 | 220 | 220 |
|---|---|---|---|---|---|---|
| | | $T_1$- Holding time (h) | 3 | 3 | 3 | 3 |
| | 2nd step | Temperature $T_2$ (° C.) | 190 | 190 | 190 | 190 |
| | | $T_2$- Holding time (h) | 2 | 2 | 2 | 2 |

| | | Charge amount (g) | Parts by mass *4 | Charge amount (g) | Parts by mass *4 | Charge amount (g) | Parts by mass *4 | Charge amount (g) | Parts by mass *4 |
|---|---|---|---|---|---|---|---|---|---|
| Esterification catalyst | Monobutyltin oxide | 9.4 | 0.1 | 9.4 | 0.1 | 9.4 | 0.1 | 9.4 | 0.1 |
| Polymerization inhibitor | Hydroquinone | 1.9 | 0.02 | 1.9 | 0.02 | 1.9 | 0.02 | 1.9 | 0.02 |
| Properties | Softening point (° C.) | 100.0 | | 99.0 | | 99.5 | | 97.4 | |
| | Highest temperature of endothermic peak (° C.) | 58.1 | | 57.2 | | 58.3 | | 56.6 | |
| | Softening point/highest temperature of endothermic peak | 1.72 | | 1.73 | | 1.71 | | 1.72 | |
| | Glass transition temperature (° C.) | 56.5 | | 55.4 | | 56.1 | | 54.9 | |
| | Weight average molecular weight Mw | 16500 | | 15000 | | 17500 | | 16000 | |
| | Number average molecular weight Mn | 3700 | | 3900 | | 3500 | | 3500 | |
| | Polydispersity (Mw/Mn) | 4.5 | | 3.8 | | 5.0 | | 4.6 | |
| | Peak top of molecular weight distribution | 8300 | | 9200 | | 7800 | | 7700 | |
| | Proportion of components having a molecular weight of 10,000 or more (%) | 44.2 | | 41.8 | | 45.9 | | 40.8 | |
| | Acid value (mgKOH/g) | 20.3 | | 21.0 | | 20.6 | | 15.2 | |

*1 BPA-PO: Polyoxypropylene (2.2) adduct of bisphenol A
*2 BPA-EO: Polyoxyethylene (2.2) adduct of bisphenol A
*3: Parts by mol relative to 100 parts by mol of all of alcohol components
*4: Amount on the basis of 100 parts by mass of the total amount of the alcohol component, the acid component (A1), and the acid component (A2)

TABLE 1

| | | | Production Example | | | | | |
|---|---|---|---|---|---|---|---|---|
| | | | A5 | | A6 | | A7 | |
| | | | | | Binder resin | | | |
| | | | A-5 | | A-6 | | A-7 | |
| | | | Charge amount (g) | Parts by mol *3 | Charge amount (g) | Parts by mol *3 | Charge amount (g) | Parts by mol *3 |
| Raw material monomer | Alcohol component (G) | BPA-PO *1 | 4900 | 70 | 7000 | 100 | 7000 | 100 |
| | | BPA-EO *2 | 1950 | 30 | — | — | — | — |
| | 1st step Acid component (A1) | Fumaric acid | 1926 | 83 | 1926 | 83 | 1926 | 83 |
| | | Terephthalic acid | — | — | — | — | — | — |
| | 2nd step Acid component (A2) | Fumaric acid | 441 | 19 | 441 | 19 | — | — |
| | | Trimellitic anhydride | — | — | — | — | 730 | 19 |
| | (A1 + A2)/G | | 1.02 | | 1.02 | | 1.02 | |
| Process | 1st step | Temperature $T_1$ (° C.) | 220 | | 220 | | 220 | |
| | | $T_1$- Holding time (h) | 3 | | 3 | | 3 | |
| | 2nd step | Temperature $T_2$ (° C.) | 190 | | 210 | | 190 | |
| | | $T_2$- Holding time (h) | 2 | | 2 | | 2 | |

| | | Charge amount (g) | Parts by mass *4 | Charge amount (g) | Parts by mass *4 | Charge amount (g) | Parts by mass *4 |
|---|---|---|---|---|---|---|---|
| Esterification catalyst | Monobutyltin oxide | 9.1 | 0.1 | 9.4 | 0.1 | 9.4 | 0.1 |
| Polymerization inhibitor | Hydroquinone | 1.8 | 0.02 | 1.9 | 0.02 | 1.9 | 0.02 |
| Properties | Softening point (° C.) | 98.4 | | 100.0 | | 102.1 | |
| | Highest temperature of endothermic peak (° C.) | 56.8 | | 57.7 | | 59.1 | |
| | Softening point/highest temperature of endothermic peak | 1.73 | | 1.73 | | 1.73 | |
| | Glass transition temperature (° C.) | 54.3 | | 55.9 | | 57.0 | |
| | Weight average molecular weight Mw | 18000 | | 20000 | | 17000 | |
| | Number average molecular weight Mn | 3900 | | 3600 | | 3600 | |
| | Polydispersity (Mw/Mn) | 4.6 | | 5.6 | | 4.7 | |
| | Peak top of molecular weight distribution | 8100 | | 8000 | | 7800 | |
| | Proportion of components having a molecular weight of 10,000 or more (%) | 41.9 | | 45.2 | | 42.1 | |
| | Acid value (mgKOH/g) | 18.4 | | 20.1 | | 29.4 | |

*1 BPA-PO: Polyoxypropylene (2.2) adduct of bisphenol A
*2 BPA-EO: Polyoxyethylene (2.2) adduct of bisphenol A
*3: Parts by mol relative to 100 parts by mol of all of alcohol components
*4: Amount on the basis of 100 parts by mass of the total amount of the alcohol component, the acid component (A1), and the acid component (A2)

TABLE 1

| | | | Production Example | | | | | |
|---|---|---|---|---|---|---|---|---|
| | | | A51 | | A52 | | A53 | |
| | | | Binder resin | | | | | |
| | | | A-51 | | A-52 | | A-53 | |
| | | | Charge amount (g) | Parts by mol *3 | Charge amount (g) | Parts by mol *3 | Charge amount (g) | Parts by mol *3 |
| Raw material monomer | Alcohol component (G) | BPA-PO *1 | 7000 | 100 | 7000 | 100 | 7000 | 100 |
| | | BPA-EO *2 | — | — | — | — | — | — |
| | 1st step | Fumaric acid | 2366 | 102 | 1926 | 83 | 1926 | 83 |
| | Acid component (A1) | Terephthalic acid | — | — | — | — | — | — |
| | 2nd step | Fumaric acid | — | — | 441 | 19 | 441 | 19 |
| | Acid component (A2) | Trimellitic anhydride | — | — | — | — | — | — |
| | (A1 + A2)/G | | 1.02 | | 1.02 | | 1.02 | |
| Process | 1st step | Temperature $T_1$ (° C.) | 220 | | 210 | | 230 | |
| | | $T_1$- Holding time (h) | 3 | | 3 | | 3 | |
| | 2nd step | Temperature $T_2$ (° C.) | — | | 190 | | 190 | |
| | | $T_2$- Holding time (h) | — | | 2 | | 2 | |
| | | | Charge amount (g) | Parts by mass *4 | Charge amount (g) | Parts by mass *4 | Charge amount (g) | Parts by mass *4 |
| Esterification catalyst | | Monobutyltin oxide | 9.4 | 0.1 | 9.4 | 0.1 | 9.4 | 0.1 |
| Polymerization inhibitor | | Hydroquinone | 1.9 | 0.02 | 1.9 | 0.02 | 1.9 | 0.02 |
| Properties | Softening point (° C.) | | 99.8 | | 98.2 | | 99.0 | |
| | Highest temperature of endothermic peak (° C.) | | 58.5 | | 57.6 | | 57.3 | |
| | Softening point/highest temperature of endothermic peak | | 1.71 | | 1.70 | | 1.73 | |
| | Glass transition temperature (° C.) | | 56.3 | | 55.6 | | 55.2 | |
| | Weight average molecular weight Mw | | 13000 | | 13500 | | 38000 | |
| | Number average molecular weight Mn | | 4200 | | 4000 | | 3600 | |
| | Polydispersity (Mw/Mn) | | 3.1 | | 3.4 | | 10.6 | |
| | Peak top of molecular weight distribution | | 11000 | | 9000 | | 7000 | |
| | Proportion of components having a molecular weight of 10,000 or more (%) | | 41.2 | | 38.5 | | 46.2 | |
| | Acid value (mgKOH/g) | | 21.0 | | 22.4 | | 18.3 | |

*1 BPA-PO: Polyoxypropylene (2.2) adduct of bisphenol A
*2 BPA-EO: Polyoxyethylene (2.2) adduct of bisphenol A
*3: Parts by mol relative to 100 parts by mol of all of alcohol components
*4: Amount on the basis of 100 parts by mass of the total amount of the alcohol component, the acid component (A1), and the acid component (A2)

TABLE 1

| | | | Production Example | | | |
|---|---|---|---|---|---|---|
| | | | A54 | | A55 | |
| | | | Binder resin | | | |
| | | | A-54 | | A-55 | |
| | | | Charge amount (g) | Parts by mol *3 | Charge amount (g) | Parts by mol *3 |
| Raw material monomer | Alcohol component (G) | BPA-PO *1 | 7000 | 100 | 7000 | 100 |
| | | BPA-EO *2 | — | — | — | — |
| | 1st step | Fumaric acid | 2088 | 90 | — | — |
| | Acid component (A1) | Terephthalic acid | 398 | 12 | 2656 | 80 |
| | 2nd step | Fumaric acid | — | — | 510 | 22 |
| | Acid component (A2) | Trimellitic anhydride | — | — | — | — |
| | (A1 + A2)/G | | 1.02 | | 1.02 | |
| Process | 1st step | Temperature $T_1$ (° C.) | 220 | | 230 | |
| | | $T_1$- Holding time (h) | 3 | | 8 | |
| | 2nd step | Temperature $T_2$ (° C.) | — | | 210 | |
| | | $T_2$- Holding time (h) | — | | 2 | |

TABLE 1-continued

|  |  | Charge amount (g) | Parts by mass *4 | Charge amount (g) | Parts by mass *4 |
|---|---|---|---|---|---|
| Esterification catalyst | Monobutyltin oxide | 9.4 | 0.1 | 9.4 | 0.1 |
| Polymerization inhibitor | Hydroquinone | 1.9 | 0.02 | 1.9 | 0.02 |
| Properties | Softening point (° C.) | 102.3 | | 105.6 | |
|  | Highest temperature of endothermic peak (° C.) | 57.2 | | 63.2 | |
|  | Softening point/highest temperature of endothermic peak | 1.79 | | 1.67 | |
|  | Glass transition temperature (° C.) | 53.4 | | 62.1 | |
|  | Weight average molecular weight Mw | 12000 | | 9000 | |
|  | Number average molecular weight Mn | 3000 | | 2800 | |
|  | Polydispersity (Mw/Mn) | 4.0 | | 3.2 | |
|  | Peak top of molecular weight distribution | 6900 | | 5800 | |
|  | Proportion of components having a molecular weight of 10,000 or more (%) | 37.2 | | 34.6 | |
|  | Acid value (mgKOH/g) | 23.2 | | 24.6 | |

*1 BPA-PO: Polyoxypropylene (2.2) adduct of bisphenol A
*2 BPA-EO: Polyoxyethylene (2.2) adduct of bisphenol A
*3: Parts by mol relative to 100 parts by mol of all of alcohol components
*4: Amount on the basis of 100 parts by mass of the total amount of the alcohol component, the acid component (A1), and the acid component (A2)

[Production of Toner]

Examples 1 to 7 and Comparative Examples 1 to 5

100 parts by mass of a binder resin mixed with a resin shown in Table 2, 5 parts by mass of a colorant "ECB-301" (manufactured by Dainichiseika Color & Chemicals Mfg. Co., Ltd. (Japan), C.I. Pigment Blue 15:3), 1 part by mass of a negatively chargeable charge control agent "LR-147" (manufactured by Japan Carlit Co., Ltd. (Japan)), and 2 parts by mass of a release agent NP-105 (manufactured by Mitsui Chemicals, Inc., a polypropylene wax, melting point: 140° C.) were thoroughly agitated with a Henschel mixer, and the mixture was melt-kneaded with a same-direction rotation type twin-screw extruder having a full length of kneading portion of 1,560 mm, a screw diameter of 42 mm, and a barrel inner diameter of 43 mm. A rotation speed of the roll was 200 r/min, a heating temperature in the roll was 120° C., a supply rate of the mixture was 10 kg/hr, and an average residence time was about 18 seconds. The obtained kneaded material was subjected to rolling and cooling with cooling rolls, and toner particles having a volume median particle diameter ($D_{50}$) of 6.5 μm were then obtained with a jet mill.

To 100 parts by mass of the obtained toner particles, 1.0 part by mass of hydrophobic silica "Aerosil R-972" (manufactured by Nippon Aerosil Co., Ltd. (Japan)) and 1.0 part by mass of hydrophobic silica "SI-Y" (manufactured by Nippon Aerosil Co., Ltd. (Japan)) were added as external additives and mixed in a Henschel mixer at 3,600 r/min for 5 minutes, to perform the treatment with external additives, thereby obtaining a toner having a volume median particle diameter ($D_{50}$) of 6.5 μm.

[Evaluation]
[Low-Temperature Fusing Property]

The obtained toner was mounted in a copier "AR-505" (manufactured by Sharp Corporation (Japan)) to obtain an unfused image (2 cm×12 cm) having an amount of the toner deposited of 0.7 mg/cm². Using a fuser of a copier "AR-505" (manufactured by Sharp Corporation (Japan)), which had been modified so as to be fusable offline (fusing rate: 200 mm/sec), a fusing test was performed at each fusing temperature while successively increasing the fusing temperature at intervals of 5° C. from 90° C. to 240° C. "CopyBond SF-70NA" (manufactured by Sharp Corporation (Japan), 75 g/m²) was used as a fused paper.

An image which had been allowed to pass through the fuser was rubbed by moving a sand-rubber eraser having a bottom size of 15 mm×7.5 mm, to which a load of 500 g was applied, backward and forward five times, and optical reflection densities before and after rubbing were measured with a reflection densitometer "RD-915" (manufactured by Macbeth (Switzerland)), and the temperature of the fusing roll at which a ratio therebetween (after rubbing/before rubbing) initially exceeded 70% was defined as a lowest fusing temperature, thereby evaluating the low-temperature fusing property.

[Roller Release Properties]

The toner was mounted in a copier "AR-505" (manufactured by Sharp Corporation (Japan)) to obtain an unfused image having a solid image part of 2 cm×12 cm (amount of the toner deposited: 0.5 mg/cm²). Using a fuser of a copier "AR-505" (manufactured by Sharp Corporation (Japan)), which had been modified so as to be fusable outside the fuser (fusing rate: 100 mm/sec), the fusing temperature was set at 170° C., paper was allowed to pass through a fusing roller, and whether or not the paper was released from the fusing roller or attached to the fusing roller was observed through visual inspection, thereby evaluating the roller release properties according to the following evaluation criteria.

(Evaluation Criteria)

A: The paper is released from the fusing roller without being bent.

B: Though the paper is released from the fusing roller, it is bent after passing through the fusing roller.

C: The paper attaches to the fusing roller.

[Pulverization Properties]

The heat-holding substance obtained in the toner production process of each of the Examples and Comparative Examples was pulverized with an 1-2 type pulverizer (manufactured by Nippon Pneumatic Mfg. Co., Ltd.) while setting a target volume median particle diameter ($D_{50}$) to 6.5 μm, and a pulverization pressure was adjusted to obtain a toner. The pulverization pressure (unit: Pa) on that occasion is shown in Table 2. It is indicated that the lower the pulverization pressure, the more favorable the pulverization properties are.

TABLE 2

| | Binder resin | | Evaluation | | |
|---|---|---|---|---|---|
| | Resin A | | Low-temperature fusing property [° C.] | Roller release properties | Pulverization properties [Pa] |
| | Resin No. | Amount (parts by mass) | | | |
| Example 1 | A-1 | 100 | 120 | A | 0.36 |
| Example 2 | A-2 | 100 | 125 | A | 0.45 |
| Example 3 | A-3 | 100 | 120 | B | 0.38 |
| Example 4 | A-4 | 100 | 120 | B | 0.38 |
| Example 5 | A-5 | 100 | 125 | A | 0.51 |
| Example 6 | A-6 | 100 | 135 | A | 0.48 |
| Example 7 | A-7 | 100 | 125 | A | 0.42 |
| Comparative Example 1 | A-51 | 100 | 140 | B | 0.58 |
| Comparative Example 2 | A-52 | 100 | 120 | B | 0.58 |
| Comparative Example 3 | A-53 | 100 | 140 | B | 0.58 |
| Comparative Example 4 | A-54 | 100 | 145 | C | 0.43 |
| Comparative Example 5 | A-55 | 100 | 140 | C | 0.38 |

In the light of the above, in comparison between the Examples and the Comparative Examples, it can be understood that the toners using the binder resins of the Examples exhibit excellent results with respect to all of low-temperature fusing property, roller release properties, and pulverization properties, as compared with the toners using the binder resins of the Comparative Examples.

REFERENCE SIGNS LIST

A: Total area of molecular weight of 10,000 or more
B: Total area of all of molecule weights
T: Peak top

The invention claimed is:

1. A method for producing a binder resin, comprising steps (1) and (2):
   step (1): mixing an aromatic alcohol comprising an alkylene oxide adduct of bisphenol A and fumaric acid at a temperature $T_1$ of 215° C. to 225° C. for 2 to 6 hours; and
   step (2): further adding fumaric acid to the mixture obtained in step (1) and mixing at a temperature $T_2$ of 180° C. to 200° C. for 1 to 6 hours until a softening point of the binder resin in the system falls within the predetermined range, wherein
   in the molecular weight distribution measured by gel permeation chromatography, the binder resin comprises 40% or more of components having a molecular weight of 10,000 or more and has a peak top of molecular weight distribution within a range of 7,500 to 10,000.

2. The method for producing a binder resin according to claim 1, wherein step (1) comprises mixing the aromatic alcohol comprising an alkylene oxide adduct of bisphenol A and the fumaric acid in an amount of 60 parts by mol to 95 parts by mol on the basis of 100 parts by mol of the aromatic alcohol.

3. The method for producing a binder resin according to claim 1, wherein in step (2), the mixing is performed until a softening point of the resin in the system falls within a range of 95° C. to 105° C.

4. The method for producing a binder resin according to claim 1, wherein the amount of the fumaric acid in step (2) is 3 parts by mol to 35 parts by mol on the basis of 100 parts by mol of the aromatic alcohol.

5. The method for producing a binder resin according to claim 1, wherein a molar ratio of a total molar amount of the amount A1 of the fumaric acid in step (1) and the amount $A_2$ of the fumaric acid in step (2) and a molar amount G of the aromatic alcohol ((A1+A2)/G) is 0.94 to 1.07.

6. The method for producing a binder resin according to claim 1, wherein a molar ratio (A1/A2) of the amount A1 of the fumaric acid in step (1) and the amount A2 of the fumaric acid in step (2) is 70/30 to 99/1.

7. The method for producing a binder resin according to claim 1, wherein in step (1), the amount of the alkylene oxide adduct of bisphenol A in the aromatic alcohol is 40 mol % to 100 mol %.

8. The method for producing a binder resin according to claim 1, wherein a softening point of the binder resin is 95° C. to 105° C.

9. The method according to claim 1, wherein said aromatic alcohol comprising an alkylene oxide adduct of bisphenol A is represented by formula (I):

$$H-(OR)_x-O-\underset{CH_3}{\underset{|}{\overset{CH_3}{\overset{|}{C}}}}-O-(RO)_y-H \quad (I)$$

(with two phenylene rings flanking the central carbon)

wherein each occurrence of R is independently selected from the group consisting of an ethylene group and a propylene group; x and y are each an average addition molar number of the alkylene oxide and a positive number; and a value of the sum of x and y is 1 to 16.

10. The method according to claim 9, wherein a value of the sum of x and y is 1.5 to 16.

11. The method according to claim 9, wherein a value of the sum of x and y is 4 to 8.

12. The method according to claim 1, wherein in step (1), the amount of the alkylene oxide adduct of bisphenol A in the aromatic alcohol is 60 mol % to 100 mol %.

13. The method according to claim 1, wherein in step (1), the amount of the alkylene oxide adduct of bisphenol A in the aromatic alcohol is 70 mol % to 100 mol %.

14. The method according to claim 1, wherein in step (1), the amount of the alkylene oxide adduct of bisphenol A in the aromatic alcohol is 90 mol % to 100 mol %.

15. The method according to claim 1, wherein in step (1), the amount of the alkylene oxide adduct of bisphenol A in the aromatic alcohol is 95 mol % to 100 mol %.

16. The method according to claim 1, wherein in step (1) $T_1$ is 218° C. to 225° C.

17. The method according to claim 1, wherein in step (1) $T_1$ is 220° C. to 225° C.

18. The method according to claim 1, wherein in step (2) $T_2$ is 185° C. to 200° C.

19. The method according to claim 1, wherein in step (2) $T_2$ is 188° C. to 195° C.

\* \* \* \* \*